US008873642B2

(12) United States Patent
Vanderhoff et al.

(10) Patent No.: US 8,873,642 B2
(45) Date of Patent: Oct. 28, 2014

(54) VIDEO CONTENT ANALYSIS METHODS AND SYSTEMS

(75) Inventors: Earl W. Vanderhoff, Cranston, RI (US); Alexander Laparidis, Mansfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 557 days.

(21) Appl. No.: 12/975,681

(22) Filed: Dec. 22, 2010

(65) Prior Publication Data

US 2012/0162505 A1 Jun. 28, 2012

(51) Int. Cl.
*H04N 7/01* (2006.01)
*H04N 17/00* (2006.01)
*H04N 5/76* (2006.01)
*G11B 27/28* (2006.01)
*G08B 13/196* (2006.01)
*H04N 19/40* (2014.01)

(52) U.S. Cl.
CPC .......... *G08B 13/19693* (2013.01); *H04N 17/00* (2013.01); *H04N 5/76* (2013.01); *G11B 27/28* (2013.01); *H04N 17/004* (2013.01); *H04N 19/00472* (2013.01)
USPC .................................................... 375/240.29

(58) Field of Classification Search
CPC ............................................... H04N 19/00472

USPC .............................. 375/240–240.29, 286–293
See application file for complete search history.

(56) References Cited

U.S. PATENT DOCUMENTS

| 7,175,408 B2* | 2/2007 | Watanabe et al. ............. 425/169 |
| 2002/0135584 A1* | 9/2002 | Lee ................................ 345/531 |
| 2003/0206666 A1* | 11/2003 | Kosugi et al. ................. 382/299 |
| 2004/0199578 A1* | 10/2004 | Kapczynski et al. ......... 709/203 |
| 2005/0129333 A1* | 6/2005 | Matsuyama et al. .......... 382/295 |
| 2008/0170751 A1* | 7/2008 | Lei et al. ...................... 382/103 |
| 2009/0040311 A1* | 2/2009 | Okamoto et al. ............. 348/181 |
| 2009/0135204 A1* | 5/2009 | Royal et al. .................. 345/667 |
| 2010/0269138 A1* | 10/2010 | Krikorian et al. .............. 725/39 |
| 2010/0328352 A1* | 12/2010 | Shamir et al. ................. 345/661 |
| 2011/0149029 A1* | 6/2011 | Kellerman et al. ............ 348/43 |

* cited by examiner

*Primary Examiner* — Christopher S Kelley
*Assistant Examiner* — Jonathan Messmore

(57) ABSTRACT

An exemplary method includes a video content analysis system capturing a first set of video frames representative of a first video content instance and a second set of video frames representative of a second video content instance, applying a morphing heuristic to at least one of the first and second sets of video frames to result in the first and second sets of video frames having a common aspect ratio, a common resolution, and a common container, frame synchronizing, subsequent to the applying of the morphing heuristic, the first and second sets of video frames, and performing a comparative analysis of the frame synchronized first and second sets of video frames. Corresponding methods and systems are also disclosed.

23 Claims, 14 Drawing Sheets

VIDEO CONTENT ANALYSIS METHODS AND SYSTEMS

BACKGROUND INFORMATION

The advent of various types of media content access devices has provided users with access to a large number and variety of media content choices. For example, a user may choose to access a variety of broadcast television programs, pay-per-view services, video-on-demand programming, and other video content by way of a set-top box device, a television, a personal computer, a mobile phone, a personal digital assistant ("FDA"), a portable media player (e.g., an iPod or the like), a tablet computer (e.g., an iPad or the like), or any other type of media content access device.

Widely varying display capabilities associated with each type of media content access device have necessitated the development of anamorphic methods for video content delivery and display. In other words, video content may be modified in different ways depending on the particular media content access device by which it will be presented. For example, video content may be stretched, scaled, windowboxed, cropped, etc. in order to be properly displayed by a particular media content access device.

It is often desirable to objectively analyze and compare anamorphic video content instances. For example, it may be desirable to compare different versions of the same movie (e.g., an HD version configured to be displayed on an HD television and a lower-resolution version configured to be displayed on a display screen of a mobile phone) to determine whether either of the two different versions contains visual artifacts or other types of errors and/or to determine a relative quality of one version versus the other. However, because of the inherently distinct nature of anamorphic video content, automatic and objective analysis and comparison of anamorphic video content has heretofore proven to be extremely difficult (or even impossible in some scenarios), resource intense, and time consuming.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Video content analysis methods and systems are described herein. As described in more detail below, a video content analysis system may capture a first set of video frames representative of a first video content instance and a second set of video frames representative of a second video content instance. In some examples, the first and/or second video content instance may be anamorphic (i.e., stretched, scaled, windowboxed (e.g., letterboxed and/or pillarboxed), distorted, cropped, or otherwise manipulated) compared to an original instance of the video content and/or may otherwise differ one from another. In order to analyze the video content instances, the video content analysis system may apply a morphing heuristic to the first and/or second set of video frames to result in the first and second sets of video frames having a common aspect ratio, a common resolution, and a common container (which, in this context, refers to a common manner in which the video frames are windowboxed or non-windowboxed). The video content analysis system may then frame synchronize the first and second video content instances and perform a comparative analysis and/or any other type of analysis on the frame synchronized first and second sets of video frames.

The methods and systems described herein may facilitate automatic, objective, and efficient analysis of video content instances. In some examples, the analysis may be performed in real-time (or faster) during a presentation of the video content instances. This is because the analysis is performed on morphed data representative of the video content instances, not on data representative of the video content instances in their native form. The morphed data is typically less information intense than the actual data representative of the video content instances and is therefore relatively faster and easier to analyze. However, as will be shown below, analysis of morphed data still yields extremely accurate results.

As used herein, "video content" and "video content instance" will be used interchangeably herein to refer to any video, movie, television program, on-demand media program, pay-per-view media program, broadcast media program (e.g., broadcast television program), IPTV media content, advertisement (e.g., commercial), video game, or any segment, component, or combination of these or other forms of video content that may be presented by a media content access device.

Figure 1:
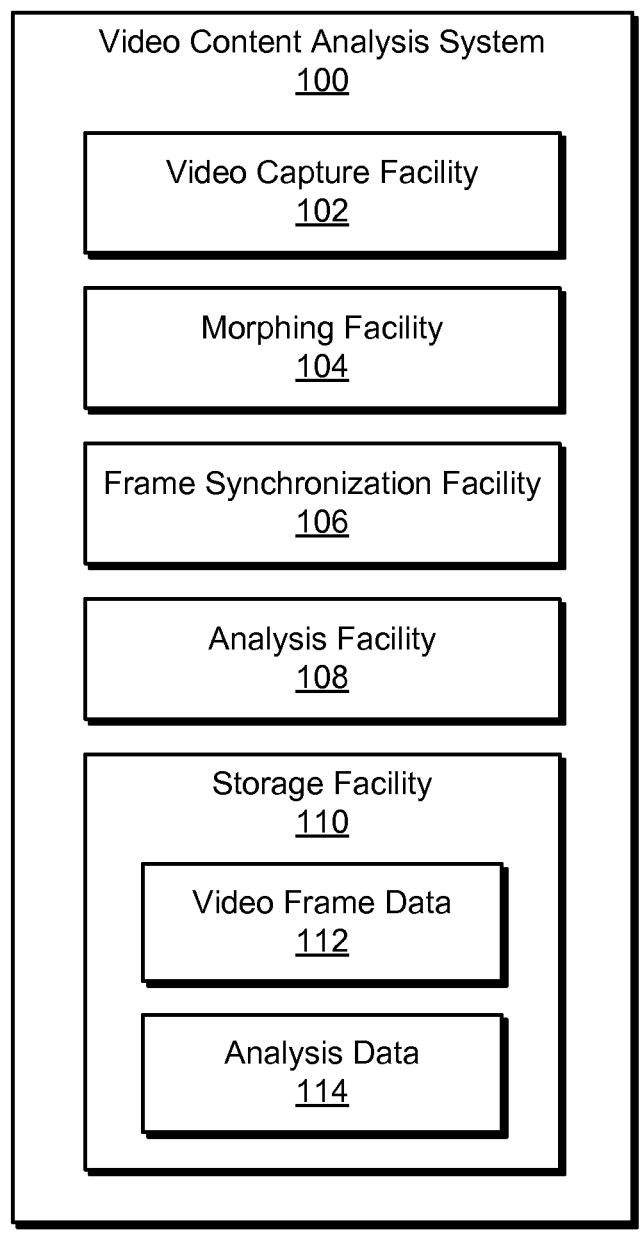
FIG. 1 illustrates an exemplary video content analysis system according to principled described herein.

FIG. 1 illustrates an exemplary video content analysis system 100 (or simply "system 100"). System 100 may be configured to analyze and compare different video content instances. For example, system 100 may be configured to analyze and compare anamorphic video content instances (i.e., one or both of the video content instances may be stretched, scaled, windowboxed, distorted, cropped, or otherwise manipulated).

System 100 may include a video capture facility 102, a morphing facility 104, a frame synchronization facility 106, an analysis facility 108, and a storage facility 110, which may be in communication with one another using any suitable communication technologies. Each of these facilities will now be described.

Video capture facility 102 may be configured to capture a first set of video frames representative of a first video content instance and a second set of video frames representative of a second video content instance. The first and second sets of video frames may be captured using any suitable video frame capture heuristic as may serve a particular implementation.

For example, video capture facility 102 may receive analog video representative of the first and second video content instances by way of one or more analog video inputs. To illustrate, the analog video may be received by way of a composite video input, a component video input, a VGA input, and/or any other type of analog video input as may serve a particular implementation.

Video capture facility 102 may then encode the received analog video into a digital format. Any suitable encoding heuristic may be performed. For example, the analog video may be encoded into an AVI or MJPEG format. In some examples, the analog video representative of each video content instance is encoded at its respective native resolution, aspect ratio, and/or frame rate. In this manner, the encoded video content instances may be recorded for subsequent playback by way of a video content analysis portal.

Video capture facility 102 may then generate the first and second sets of video frames by transcoding the encoded analog video and storing each video frame included in the first and second sets of video frames as an individual file. For example, video capture facility 102 may convert the encoded video to a plurality of still images (i.e., video frames) and store (e.g., save) each still image as an image file (e.g., a JPEG file). In this manner, as will be described in more detail below, the image files may be subsequently modified during a morphing process.

Additionally or alternatively, video capture facility 102 may receive digital video representative of the first and second video content instances by way of one or more digital video inputs. Video capture facility 102 may then generate the first and second sets of video frames by transcoding the received digital video. Each video frame included in the first and second sets of video frames may be stored as an individual file, as described above. The digital video may be received by way of an HDMI input, an SDI input, and/or any other type of digital video input. In some examples, the digital video may be streamed to system 100.

Additionally or alternatively, video capture facility 102 may capture the first and second sets of video frames by processing files comprising data representative of the first and second video content instances. The files may have any suitable file format (e.g., Windows Media Video ("WMV") format, QuickTime format, Flash, MPEG, MPEG-2, MPEG-4, AVI, MJPEG, etc.). For example, video capture facility 102 may generate the first and second sets of video frames by transcoding data included in a first file representative of the first video content instance and data included in a second file representative of the second video content instance. Video capture facility 102 may then store each video frame included in the first and second sets of video frames as an individual file.

It will be recognized that a combination of any of the video frame capture heuristics described above may alternatively be used. For example, the first video content instance processed by video capture facility 102 may be represented by analog video received by way of an analog video input while the second video content instance may be represented by digital video received by way of a digital video input or by a file.

It will also be recognized that the video content instances processed by video capture facility 102 may have any resolution and scan rate (e.g., 480i, 408p, 576, 720p, 1080i, 1080p, etc.), aspect ratio (e.g., 4:3, 16:9, etc.), frame rate (e.g., 23.98 frames per second ("fps"), 25 fps, 29.97 fps, 30 fps, etc.), container (e.g., letterboxing, pillarboxing, etc.), and/or any other attribute as may serve a particular implementation.

In some examples, video capture facility 102 may capture the first and second sets of video frames at the native frame rates of their corresponding video content instances. For example, the first video content instance may have a native frame rate of 25 frames per second and the second video content instance may have a native frame rate of 30 frames per second. Video capture facility 102 may accordingly capture the first set of video frames at 25 frames per second and the second set of video frames at 30 frames per second. The disparate frame rates may be subsequently justified during a comparative analysis of the frame synchronized first and second sets of video frames. Alternatively, frame capture facility 102 may capture the first and second sets of video frames at a common frame capture rate. The common frame capture rate may be set to any value as may serve a particular implementation.

Video capture facility 102 may be further configured to capture audio content (e.g., by sampling one or more audio levels) associated with each captured video frame. The audio content may be input by way of any suitable analog and/or digital audio input (e.g., a multi-channel audio input, HDMI, SDI, left/right RCE, AES/EBU, etc.).

Morphing facility 104 may be configured to apply a morphing heuristic to the first and/or second set of video frames to result in the first and second sets of video frames having a common aspect ratio, a common resolution, and a common container. In other words, at least one of the sets of video frames is digitally modified so that the two sets of video frames have the same aspect ratio, resolution, and container. For example, morphing facility 104 may remove (e.g., crop) windowboxing from the first and second sets of video frames, stretch or otherwise manipulate the first and second sets of video frames to a 4:3 aspect ratio, and scale the first and second sets of video frames to a 320 by 240 pixel resolution. In this manner, as will be described below, a pixel by pixel comparison of temporally corresponding video frames in the first and second sets of video frames may be performed. It will be recognized that the first and/or second set of video frames may be morphed to any predetermined aspect ratio, resolution, and container as may serve a particular implementation and that the morphing heuristic may implement any suitable digital image processing technique.

In some examples, morphing facility 104 may be further configured to remove extended imagery from either the first or second set of video frames. Extended imagery (i.e., additional graphical content) in one set of video frames compared to another may be the result of one or more cropping techniques applied to the first and/or second video content instances. For example, cropping techniques such as, but not limited to, pan and scan, tilt and scan, and/or reframing may be applied to a video content instance in order to make the video content instance fit within a particular size of display screen.

Morphing facility 104 may remove extended imagery from either the first or second set of video frames in any suitable manner as may serve a particular implementation. For example, morphing facility 104 may provide a portal wherein a user may manually identify a portion of a video frame in one of the sets of video frames that includes extended imagery. Alternatively, morphing facility 104 may automatically identify the portion of the video frame that includes extended imagery. In either case, morphing facility 104 may use the coordinates of the identified portion to automatically crop that portion from each of the video frames within the set of video frames.

After the morphing heuristic has been applied to the first and/or second sets of video frames, frame synchronization facility 106 may frame synchronize the first and second sets of video frames. In other words, frame synchronization facility 106 may remove temporal latency that may exist between corresponding scenes represented by the first and second sets of video frames. An exemplary frame synchronization heuristic that may be used by frame synchronization facility 106 will be described in more detail below.

Analysis facility 108 may be configured to perform a comparative analysis (also referred to as a partial referenced analysis) of the frame synchronized first and second sets of video frames. The comparative analysis performed by analysis facility 108 may be used to detect artifacts (also referred to herein as "errors") such as, but not limited to, tiling, blocking, fuzziness, freezing, loss of audio synchronization, differences in scene sharpness, differences in contrast, color and luminance shifts, etc.

In some examples, analysis facility 108 may perform a comparative analysis by performing a pixel by pixel comparison of temporally corresponding video frames included in the first and second sets of video frames to determine whether the temporally corresponding video frames vary one from another above a predetermined threshold. If they do, a more computationally intense analysis (e.g., a "deep-dive analysis") of the temporally corresponding video frames may be performed. An exemplary pixel by pixel comparison heuristic will be described in more detail below.

Analysis facility 108 may be further configured to perform any other type of analysis of the first and second sets of video frames as may serve a particular implementation. For example, analysis facility 108 may perform an unreferenced video analysis of one or more video frames included in the first and/or second sets of video frames. As used herein, an "unreferenced video analysis" is one that analyzes a particular video frame without comparing the video frame to another video frame. Unreferenced video analysis may be performed to detect egregious errors such as, but not limited to, a lack of audio content, frozen video content, and/or blank video content.

Analysis facility 108 may be further configured to provide a video content analysis portal within which various types of information and/or content may be presented to a user of system 100. For example, analysis facility 108 may display (e.g., concurrently) unmorphed and unsynchronized video content instances (e.g., in their native aspect ratios, resolutions, and containers) within the video content analysis portal in response to user input so that the user may visually compare the unmorphed video content instances or otherwise analyze the unmorphed video content instances.

Additionally or alternatively, analysis facility 108 may display the video content instances after they have been morphed and frame synchronized. For example, analysis facility 108 may display (e.g., concurrently) first and second video content instances represented by the first and second sets of video frames that have been morphed and frame synchronized. Information associated with the first and second video content instances (e.g., descriptions of the artifacts or errors identified in the video content instances) may additionally be displayed within the video content analysis portal, as will be described in more detail below.

Storage facility 110 may be configured to maintain video frame data 112 representative of captured video frames and analysis data 114 generated or otherwise associated with analysis facility 108. Storage facility 110 may maintain additional or alternative data as may serve a particular implementation.

FIGS. 2-5 illustrate various implementations of system 100. It will be recognized that the implementations illustrated in FIGS. 2-5 are merely illustrative of the many possible implementations of system 100.

Figure 2:
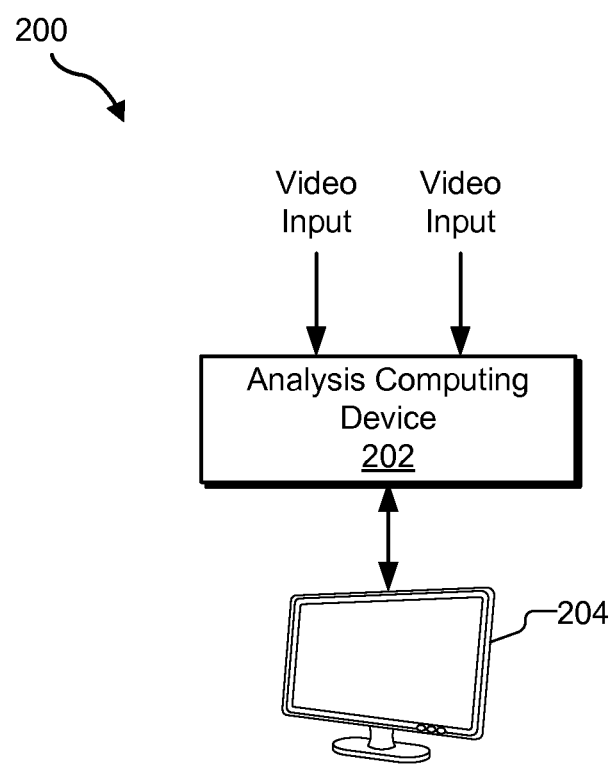
FIGS. 2-5 illustrate various implementations of the system of FIG. 1 according to principled described herein.

FIG. 2 illustrates an exemplary implementation 200 wherein system 100 is implemented by a single analysis computing device 202. Analysis computing device 202 may include any suitable computing device (e.g., a personal computer, a server, etc.) configured to perform the functions of system 100. In some examples, analysis computing device 202 may include or be in communication with one or more storage devices (e.g., hard drives, etc.) configured to maintain video frame data 112 and/or analysis data 114.

Analysis computing device 202 may include one or more input ports configured to accept video input, as shown in FIG. 2. The video input may be any type of video input as may serve a particular implementation. For example, the video input may include analog video input, digital video input, and/or any other type of input as may serve a particular implementation. Analysis computing device 202 may additionally or alternatively be configured to receive and process one or more video content files, video content streams, audio content, and/or other content as may serve a particular implementation.

As shown, analysis computing device 202 may be communicatively coupled to a display device 204 (e.g., a computer monitor, a television, etc.). Display device 204 may be configured to display content (e.g., a video content analysis portal) generated or otherwise provided by analysis computing device 202.

Figure 3:
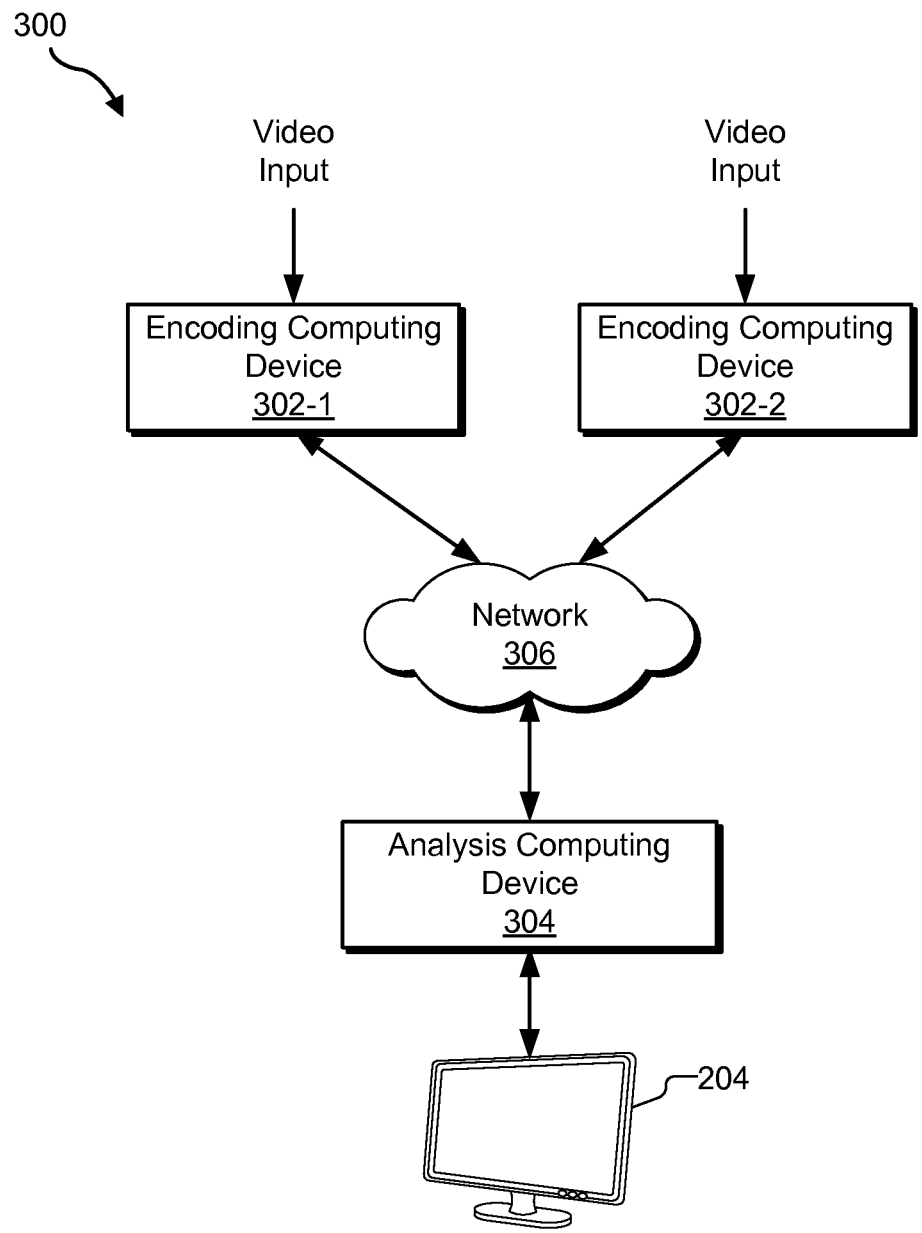

FIG. 3 illustrates an alternative implementation 300 wherein system 100 is implemented by multiple computing devices. For example, implementation 300 may include a first encoding computing device 302-1 and a second encoding computing device 302-2 (collectively referred to herein as "encoding computing devices 302") configured to communicate with an analysis computing device 304 by way of a network 306. Communications between encoding computing devices 302 and analysis computing device 304 by way of network 306 may include any suitable network-carried communications such as TCP, IP, TCP/IP, Wi-Fi, Ethernet, etc. connections. Network 306 may include one or more networks or types of networks (and communication links thereto) capable of carrying signals between encoding computing devices 302 and analysis computing device 304. For example, network 306 may include, but is not limited to, one or more local area networks, wide area networks, wireless data networks, subscriber television networks (e.g., broadcast, multicast, and/or narrowcast television networks), satellite networks, cable networks, hybrid fiber coax networks, broadband networks, the Internet, and any other networks capable of carrying data and/or communications signals.

Encoding computing devices 302 may each include one or more input ports configured to accept video input of any type. For example, first encoding computing device 302-1 may receive a first video content instance and generate a first set of video frames representative of the first video content instance (e.g., by encoding and transcoding the first video content instance). Likewise, second encoding computing device 302-1 may receive a second video content instance and generate a second set of video frames representative of the second video content instance (e.g., by encoding and transcoding the second video content instance). Encoding computing devices 302 may then transmit the first and second sets of video frames to analysis computing device 304, which may morph, frame synchronize, and analyze the first and second sets of video frames as described above.

It will be recognized encoding computing devices 302 and analysis computing device 304 may each implement any of the facilities 102-110 of system 100. For example, encoding computing devices 302 may perform a portion of the morphing heuristic (e.g., encoding computing devices 302 may remove windowboxing, stretch or otherwise manipulate the first and second sets of video frames to a common aspect ratio, and/or scale the first and second sets of video frames to a common resolution) while analysis computing device 304 may perform a remaining portion of the morphing heuristic.

Figure 4:
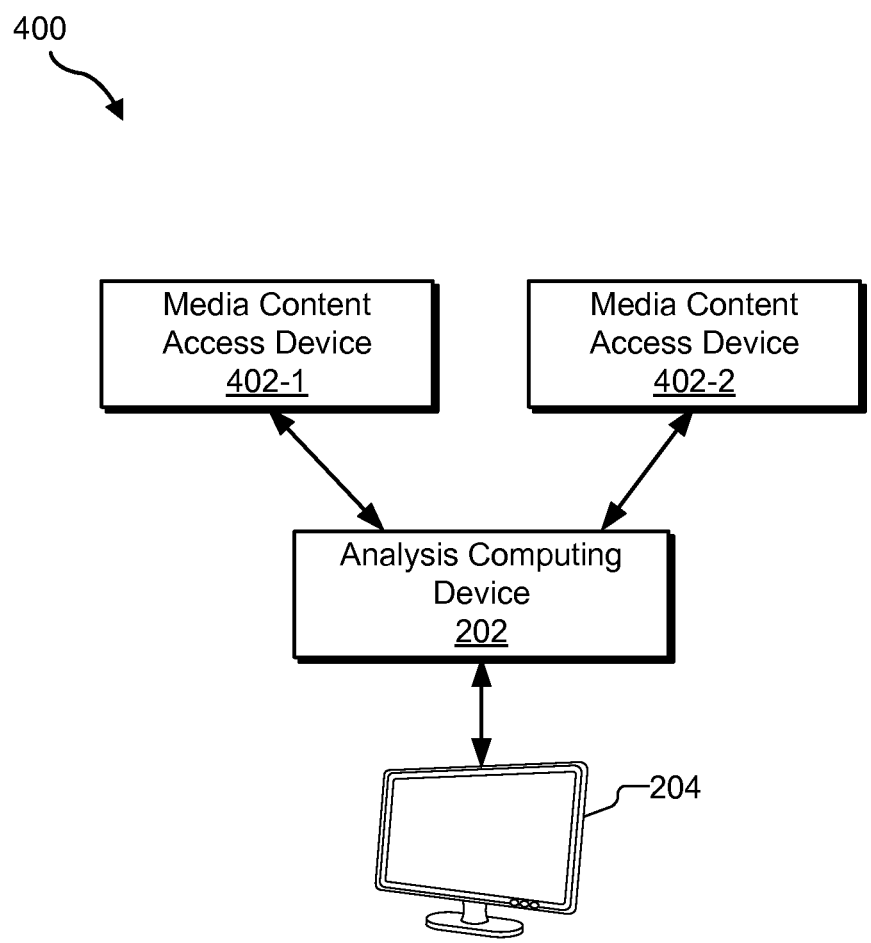

FIG. 4 illustrates an exemplary implementation 400 wherein the first and second video content instances are provided by media content access devices 402 (e.g., media content access devices 402-1 and 402-2). As shown, media content access devices 402 may be coupled directly to analysis computing device 202. Additionally or alternatively, media content access devices 402 may be communicatively coupled to analysis computing device 202 by way of one or more networks (e.g., network 306) and/or to encoding computing devices 302.

Media content access devices 402 may include any type of media content access device capable of outputting video content by way of an analog and/or digital output port (e.g., a composite video output port, a component video output port, a VGA output port, a coaxial cable output port, an HDMI output port, a SDI output port, etc.). For example, media content access devices 402 may each include a set-top box device, a television, a personal computer, a mobile phone, a personal digital assistant ("FDA"), a portable media player (e.g., an iPod or the like), a tablet computer (e.g., an iPad or the like), or any other type of media content access device.

To illustrate, media content access device 402-1 may include a first set-top box device and media content access device 402-2 may include a second set-top box device. The first and second set-top box devices may each output a video content instance. The video content instances may be analyzed by analysis computing device 202 to compare a video output quality (or any other video content feature) of the set-top box devices.

In some instances, a media content access device (e.g., some types of televisions, mobile phones, etc.) does not have a video output port. Hence, video content displayed by the media content access device may not be input directly into analysis computing device 202. In such instances, one or more video cameras may be used to acquire the video content displayed by the media content access device. The acquired video content may then be input into analysis computing device 202.

Figure 5:
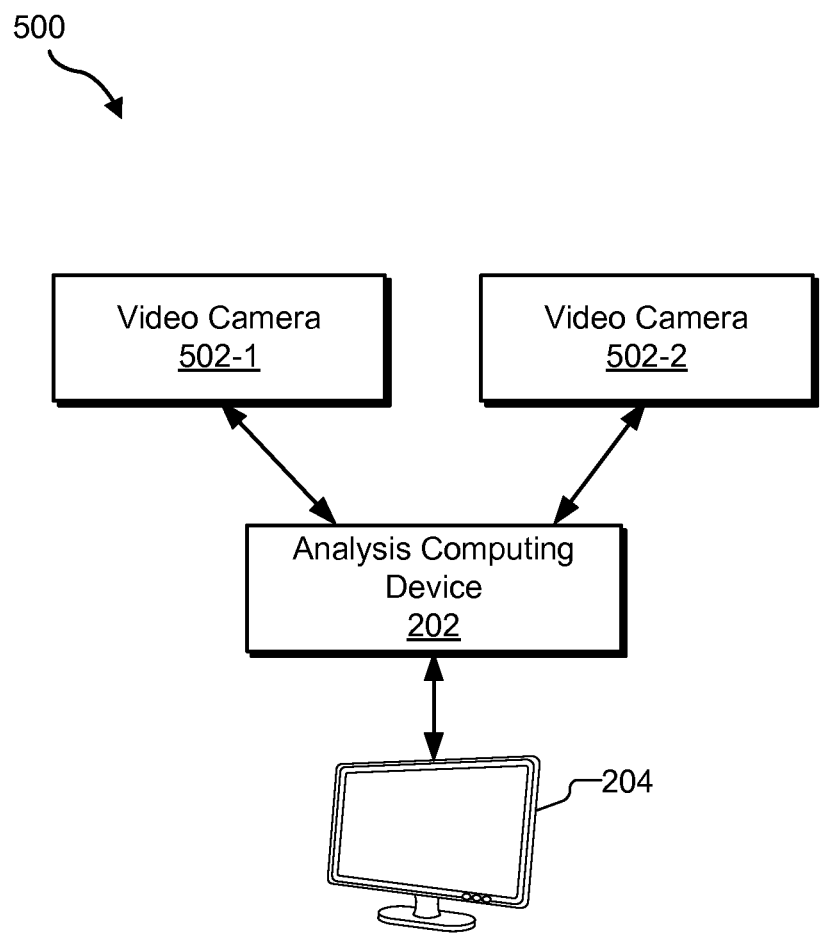

To illustrate, FIG. 5 shows an exemplary implementation 500 wherein video cameras 502 (e.g., video cameras 502-1 and 502-2) are communicatively coupled to analysis computing device 202. Video cameras 502 may include any suitable video camera configured to acquire video content being displayed by one or more media content access devices. In some examples, video camera 502-1 may acquire video content displayed by a first media content access device and video camera 502-2 may acquire video content displayed by a second media content access device. The acquired video content may be transmitted to analysis computing device 202 in any suitable manner. Analysis computing device 202 may then analyze the acquired video content. In some examples (e.g., when the acquired video content is streamed to analysis computing device 202), analysis computing device 202 may analyze the video content in real-time as the video content is displayed by the media content access devices.

Figure 6:
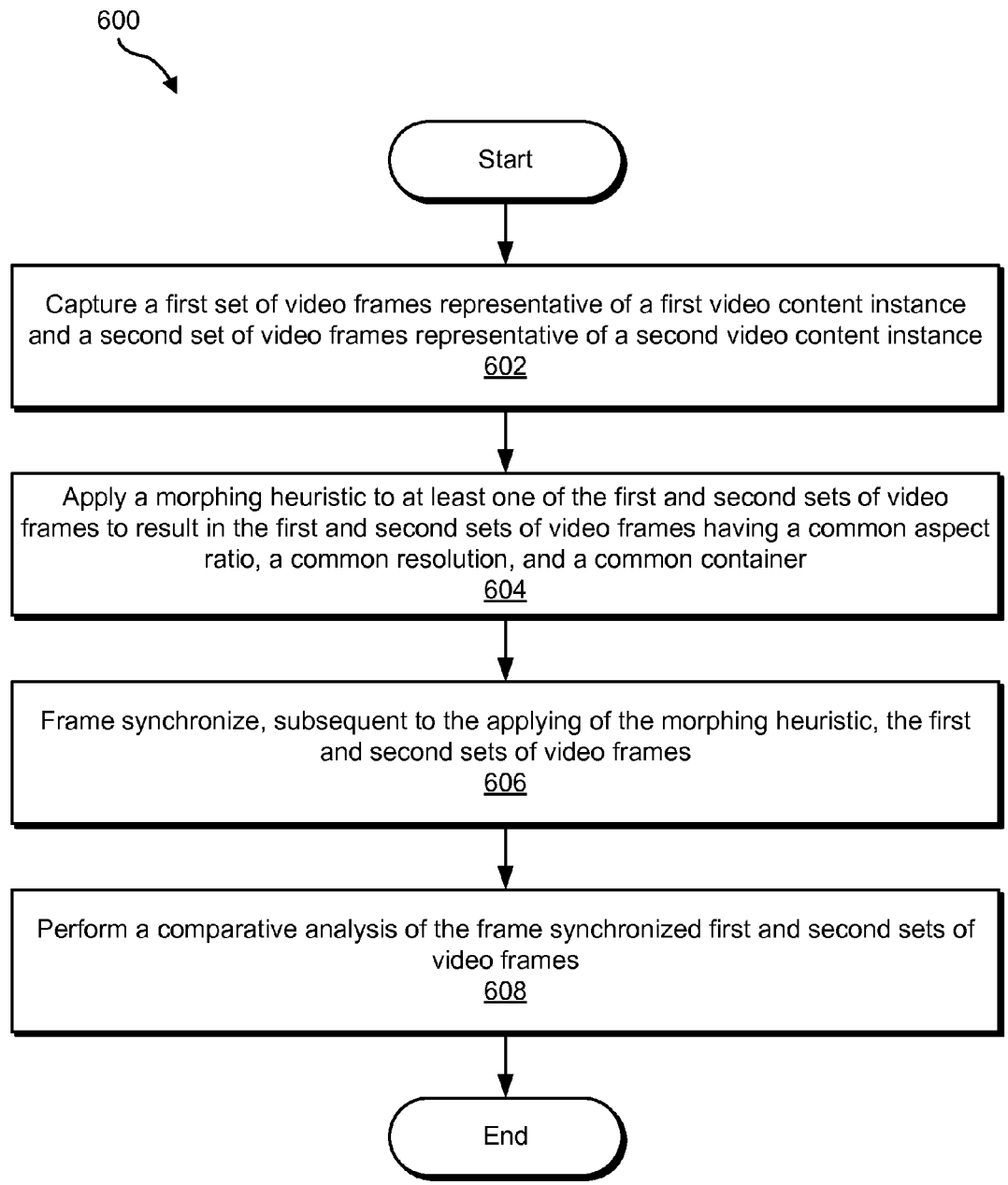
FIG. 6 illustrates an exemplary video content analysis method according to principled described herein.

FIG. 6 illustrates an exemplary video content analysis method 600. While FIG. 6 illustrates exemplary steps according to one embodiment, other embodiments may omit, add to, reorder, and/or modify any of the steps shown in FIG. 6. The steps shown in FIG. 6 may be performed by any component or combination of components of system 100, analysis computing device 202, encoding computing devices 302, analysis computing device 304, and/or video cameras 502.

In step 602, a first set of video frames representative of a first video content instance and a second set of video frames representative of a second video content instance are captured. Step 602 may be performed in any of the ways described herein.

In step 604, a morphing heuristic is applied to at least one of the first and second sets of video frames to result in the first and second sets of video frames having a common aspect ratio, a common resolution, and a common container. Step 604 may be performed in any of the ways described herein.

In step 606, the first and second sets of video frames are frame synchronized subsequent to the applying of the morphing heuristic. Step 606 may be performed in any of the ways described herein.

In step 608, a comparative analysis of the frame synchronized first and second sets of video frames is performed. Step 608 may be performed in any of the ways described herein.

An example of method 600 will now be provided in connection with FIGS. 7-12. It will be recognized that the example provided herein is merely illustrative of the many possible examples of method 600.

Figure 7:
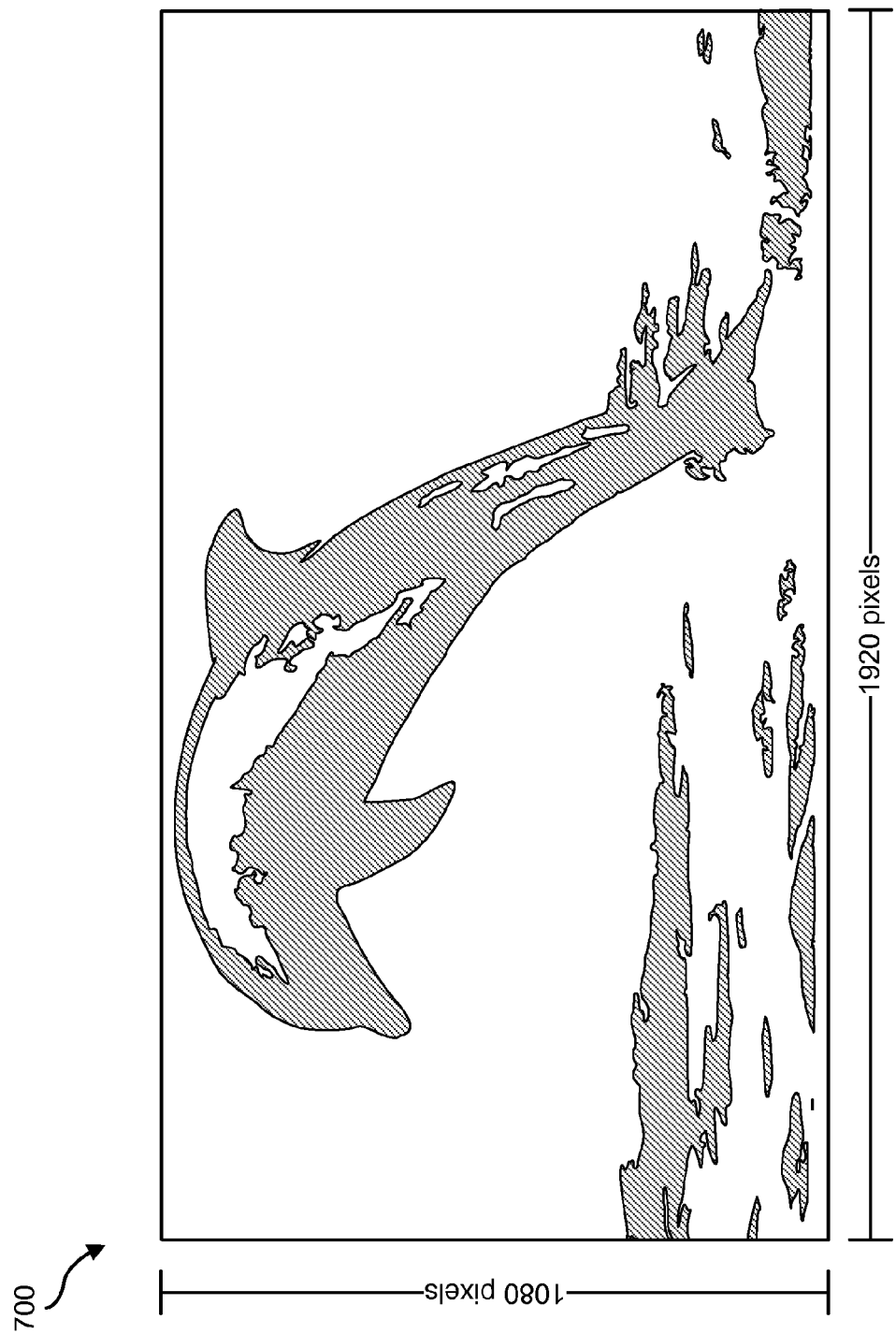
FIGS. 7-12 illustrate an exemplary implementation of the method of FIG. 6 according to principled described herein.

FIG. 7 illustrates an exemplary scene 700 of a video content instance (e.g., a movie). The video content instance may be originally generated (e.g., filmed) in a particular aspect ratio, resolution, and container. For purposes of this example, it will be assumed that the video content instance is originally generated in a 16:9 aspect ratio, has a resolution of 1920 by 1080 pixels, and is non-windowboxed.

Figure 8:
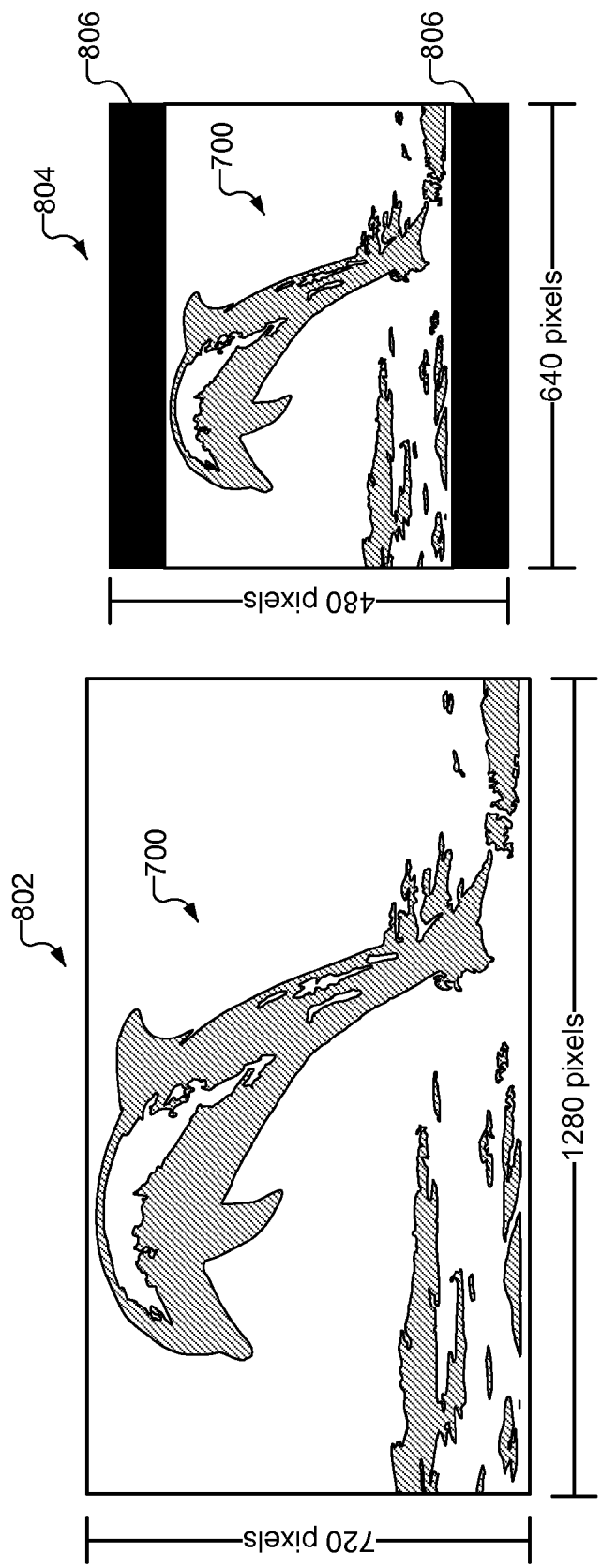

FIG. 8 shows two different video frames 802 and 804 of modified versions of the video content instance of FIG. 7. As shown, both video frames 802 and 804 show scene 700, but they have been modified so that they may be displayed on different types of display screens. For example, the resolution of video frame 802 has been reduced to 1280 by 720 pixels so that it may be displayed by a display device having a 16:9 aspect ratio and a 720p resolution. Likewise, the resolution of video frame 804 has been reduced to 640 by 480 pixels so that it may be displayed by a display device having a 4:3 aspect ratio. As shown, letterboxing 806 has also been added to video frame 804 so that scene 700 may be displayed in its native widescreen format. It will be recognized that the anamorphic video content instances of which video frames 802 and 804 are a part may be modified by media content access devices communicatively coupled to the display devices, by a content provider, and/or by any other computing device.

In some instances, it may be desirable to analyze (e.g., compare) the anamorphic video content instances of which video frames 802 and 804 are a part. To this end, system 100 may capture a first set of video frames (including video frame 802) corresponding to the first video content instance and a second set of video frames (including video frame 804) corresponding to the second video content instance. System 100 may capture the sets of video frames in any of the ways described herein. In some examples, system 100 may also record the first and second video content instances in their native aspect ratios, resolutions, and containers so that they may be subsequently played back by way of a video content analysis portal.

A morphing heuristic may be applied to the captured video frames in any of the ways described herein. In some examples, the morphing heuristic may be applied to the captured video frames in real-time as the video frames are captured. Additionally or alternatively, the morphing heuristic may be applied to the captured video frames after they have been captured.

Figure 9:
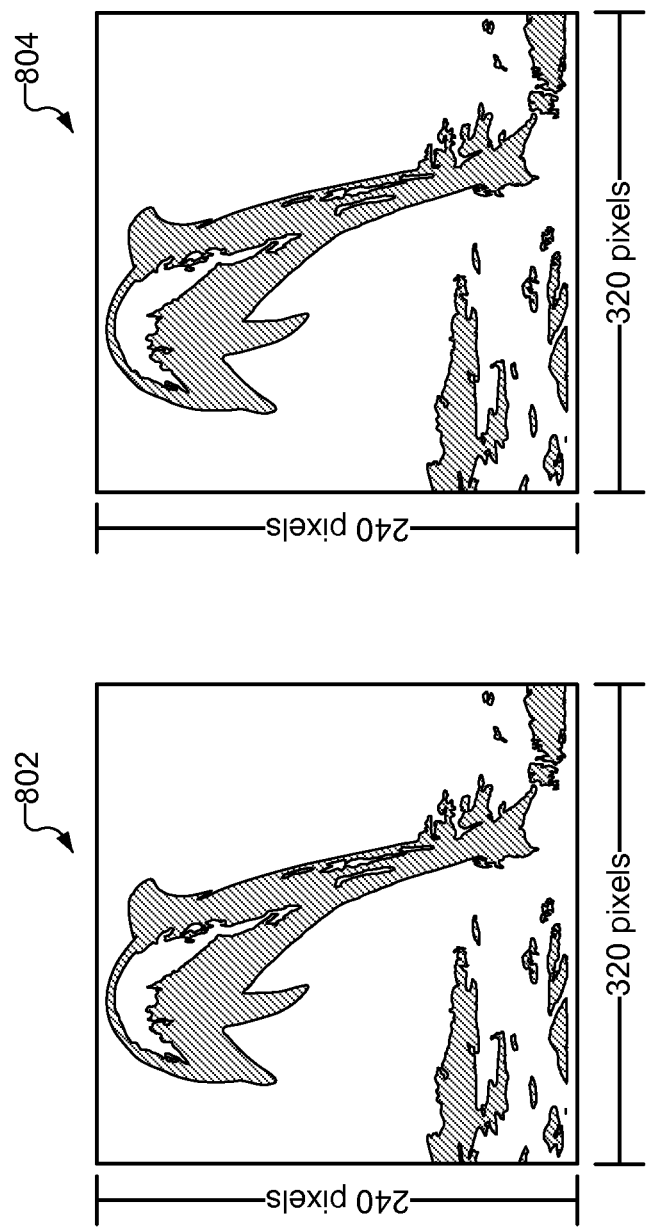

As described above, application of the morphing heuristic may result in the first and second sets of video frames having a common aspect ratio, a common resolution, and a common container. To illustrate, FIG. 9 shows video frames 802 and 804 after they have been morphed to a common aspect ratio, a common resolution, and a common container. As shown, video frame 802 has been reduced to an aspect ratio of 4:3 and a resolution of 320 by 240 pixels. FIG. 9 also shows that the letterboxing 806 has been removed from video frame 804 and that it has also been reduced to a resolution of 320 by 240 pixels while maintaining an aspect ratio of 4:3.

It will be recognized that in many cases, such as in this example, application of the morphing heuristic to a video frame reduces the amount of information included in the video frame. For example, video frame 802 was reduced from a 1280 by 720 pixel resolution to a 320 by 240 pixel resolution. This makes the comparative analysis of frames 802 and 804 relatively more efficient because there is less information to analyze.

After the first and second sets of video frames have been morphed to a common aspect ratio, a common resolution, and a common container, the first and second sets of video frames may be frame synchronized. In this manner, as will be described below, temporally corresponding video frames within the first and second sets of video frames may be compared one to another.

The first and second sets of video frames may be frame synchronized in any suitable manner. For example, system 100 may analyze the first set of video frames to locate a particular scene change. System 100 may then analyze the second set of video frames to locate the same scene change. The video frames within each set of video frames at which the scene change occurs may be marked as being temporally corresponding one to another. This and other processes for frame synchronizing the first and second sets of video frames are described more fully in co-pending U.S. patent application Ser. No. 12/882,428, entitled SYNCHRONIZING VIDEOS, and filed Sep. 15, 2010, the contents of which are hereby incorporated by reference. For illustrative purposes, it will be assumed that video frames 802 and 804 temporally correspond one to another.

After the first and second sets of video frames have been frame synchronized, they may be comparatively analyzed. As mentioned, system 100 may perform a comparative analysis by performing a pixel by pixel comparison of temporally corresponding video frames included in the first and second sets of video frames to determine whether the temporally corresponding video frames vary one from another above a predetermined threshold.

Figure 10:
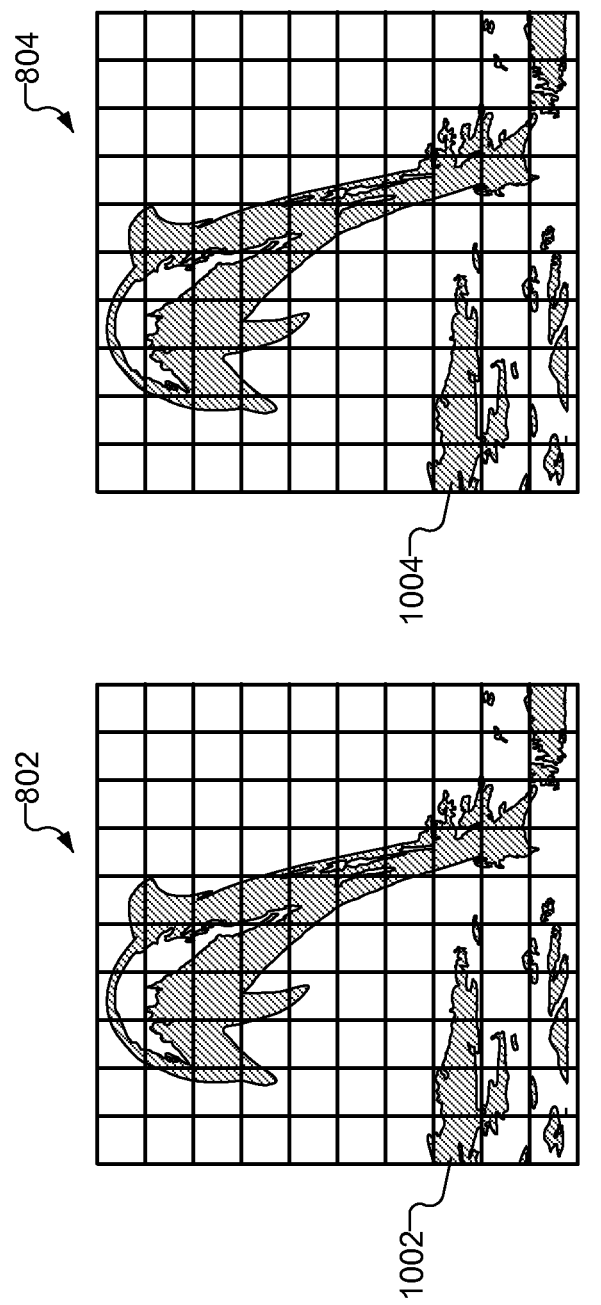

To illustrate, FIG. 10 shows video frame 802 divided into a first plurality of pixels (e.g., pixel 1002) and video frame 804 divided into a second plurality of pixels (e.g., pixel 1004). The pixels shown in FIG. 10 are illustrative only and are not to scale. In some examples, the pixel by pixel analysis may compare each color component (e.g., red, green, and blue) included within spatially corresponding pixels. For example, pixels 1002 and 1004 spatially correspond one to another. Hence, system 100 may compare an amount of red, an amount of green, and an amount of blue included in each of pixels 1002 and 1004. By comparing each color component, a substantial number of comparison data points between temporally corresponding video frames may be achieved. For example, assuming that the first and second sets of video frames each have a resolution of 320 by 240 pixels and frame rates of 25-30 frames per second, the pixel by pixel comparison results in 5,760,000-6,912,000 data points to describe any given second of video.

The detected differences in color for each pair of corresponding pixels within video frames 802 and 804 may be used to generate a composite delta value representing an overall difference between the video frames 802 and 804. If the composite delta value is greater than a predetermined threshold, system 100 may designate at least one of video frames 802 and 804 as including an error.

In some examples, if the composite delta value is greater than the predetermined threshold, system 100 may perform a more computationally intense analysis (e.g., a "deep-dive analysis") of video frames 802 and 804 to further identify the specific type of error, the particular pixel or pixels associated with the error, and/or any other information associated with the error as may serve a particular implementation. In some examples, the more computationally intense analysis may include a contextual analysis of one or more video frames surrounding video frames 802 and 804.

It will be recognized that any other type of comparative analysis may be performed on temporally corresponding video frames. For example, system 100 may compare audio content associated with each of video frames 802 and 804. If the audio content is different, it may be indicative of a loss of audio synchronization in video frame 802 and/or video frame 804.

As mentioned, the comparative analysis performed by analysis facility 108 may be used to detect errors such as, but not limited to, tiling, blocking, fuzziness, freezing, loss of audio synchronization, differences in scene sharpness, differences in contrast, color and luminance shifts, etc. For example, the pixel by pixel analysis of video frames 802 and 804 may determine that video frame 804 is a certain amount (e.g., percentage) fuzzier than video frame 802.

System 100 may additionally perform an unreferenced video analysis of one or more video frames included in the first and/or second sets of video frames. As mentioned, unreferenced video analysis may be performed to detect egregious errors such as, but not limited to, a lack of audio content, frozen video content, and/or blank video content. For example, system 100 may perform an unreferenced video analysis of video frame 802 to determine whether video frame 802 lacks audio content and/or whether any other type of error is associated with video frame 802.

Figure 11:
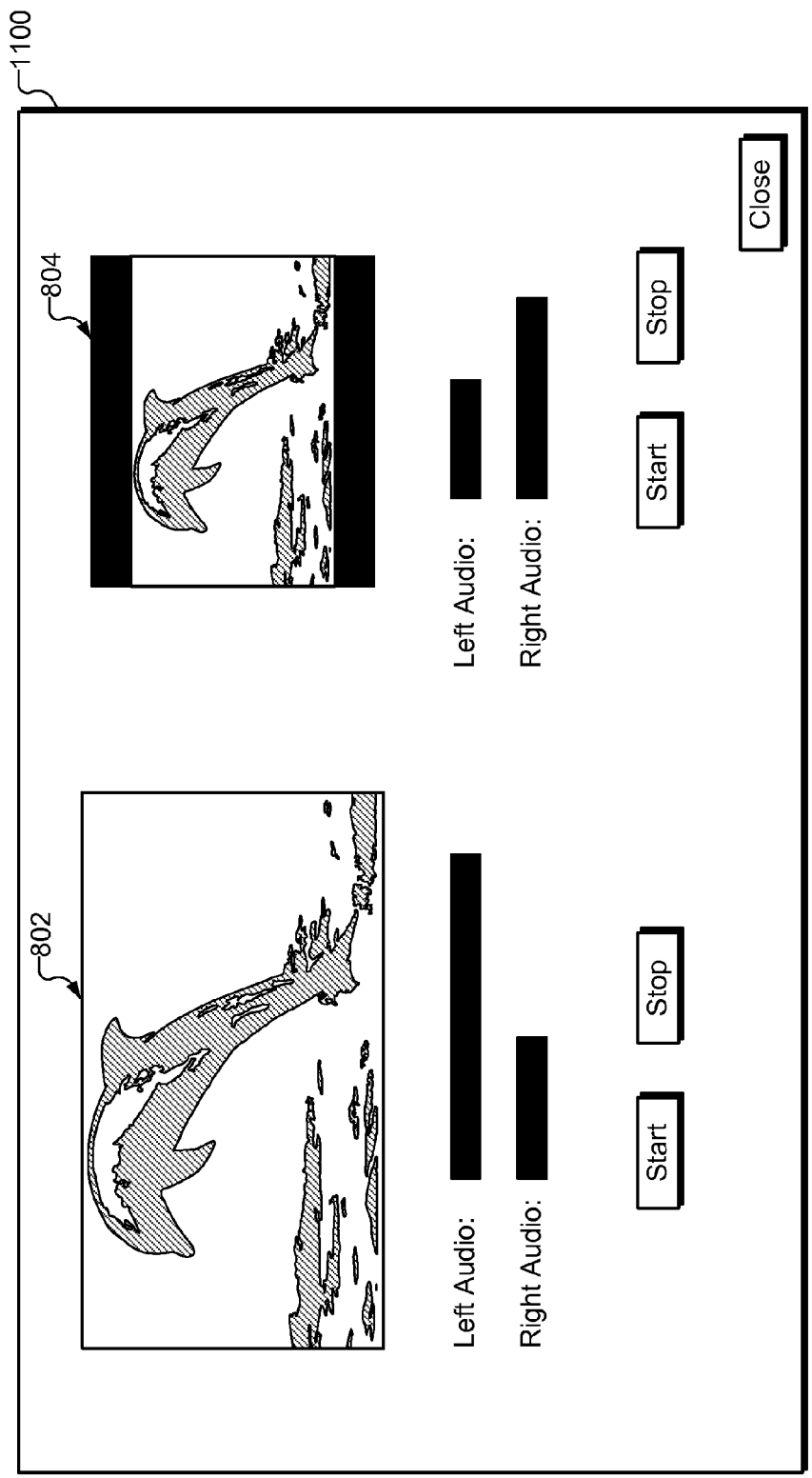

As mentioned, system 100 may also record the first and second video content instances corresponding to video frames 802 and 804, respectively, in their native aspect ratios, resolutions, and containers so that they may be subsequently played back by way of a video content analysis portal. To illustrate, FIG. 11 shows an exemplary video content analysis portal 1100 that may be presented for display by system 100. As shown, the recorded first and second video content instances (represented by video frames 802 and 804, respectively) may be displayed within video content analysis portal 1100. In this manner, a user may view the first and/or second video content instances in their native formats. Additional information (e.g., audio content information, etc.) associated with the recorded video content instances may be displayed within video content analysis portal 1100 as may serve a particular implementation.

Figure 12:
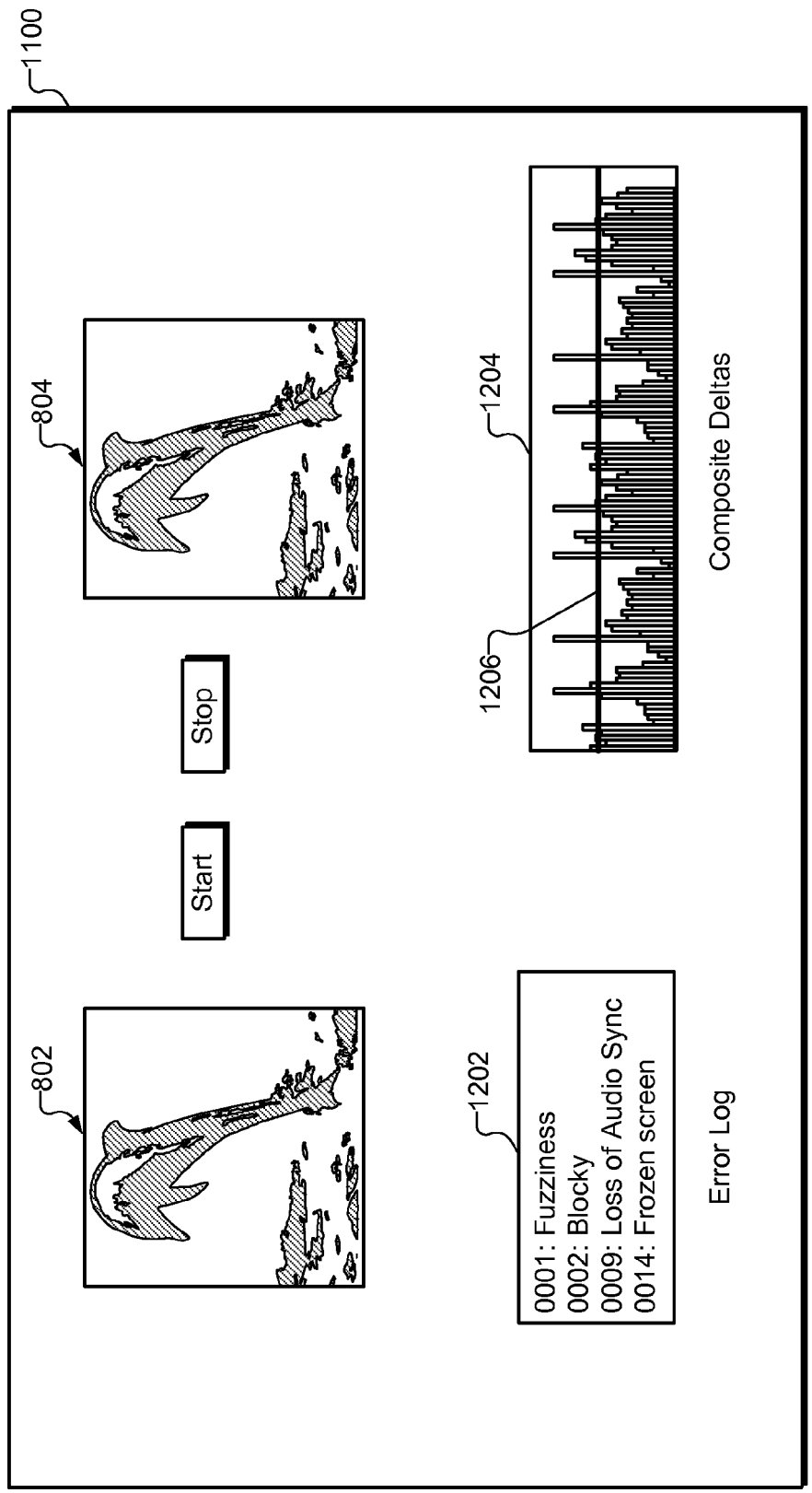

Additionally or alternatively, the morphed and frame synchronized video content instances may be displayed within video content analysis portal 1100. For example, FIG. 12 shows the first and second morphed and frame synchronized video content instances (represented by video frames 802 and 804, respectively) displayed within video content analysis portal 1100. As shown, additional information associated with the morphed and frame synchronized video content instances may be displayed within video content analysis portal 1100.

For example, system 100 may log one or more detected errors and present the logged one or more errors as a table 1202 displayed within video content analysis portal 1100. In some examples, table 1202 includes one or more display elements each representative of one of the logged errors. One or more of the display elements may be selected to access additional information associated with corresponding logged errors and/or present video frames associated with the corresponding logged errors.

Additionally or alternatively, a graphical representation 1204 of composite delta values associated with the morphed and frame synchronized video content instances may be displayed within video content analysis portal 1100. As shown, a horizontal line 1206 representative of the predetermined threshold may be superimposed over graphical representation 1204. In this manner, a user may visually identify an overall quality of the first and second video content instances and/or identify certain video frames that contain errors.

Figure 13:
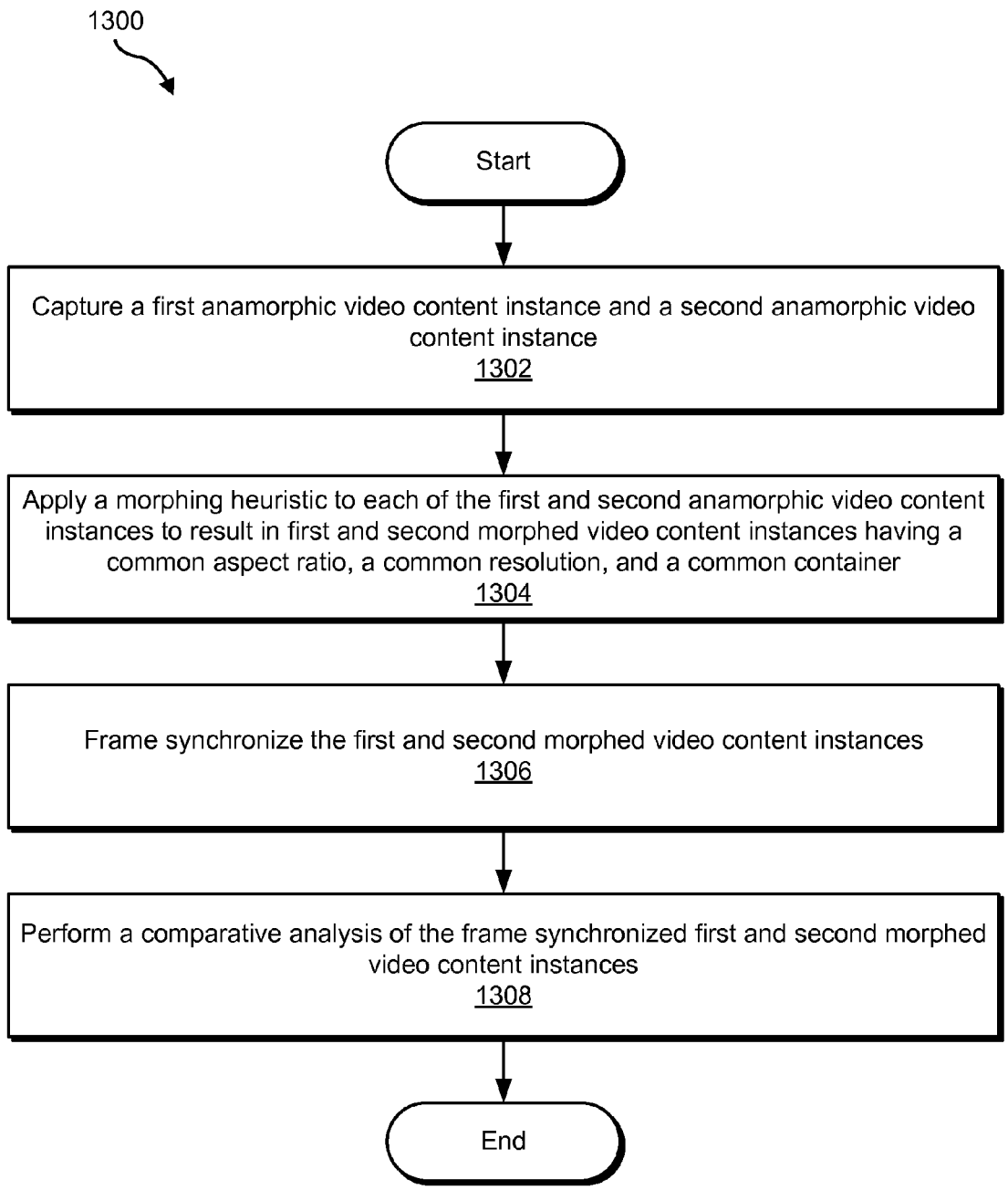
FIG. 13 illustrates another exemplary video content analysis method according to principled described herein.

FIG. 13 illustrates another exemplary video content analysis method 1300. While FIG. 13 illustrates exemplary steps according to one embodiment, other embodiments may omit, add to, reorder, and/or modify any of the steps shown in FIG. 13. The steps shown in FIG. 13 may be performed by any component or combination of components of system 100, analysis computing device 202, encoding computing devices 302, analysis computing device 304, and/or video cameras 502.

In step 1302, a first anamorphic video content instance and a second anamorphic video content instance are captured. Step 1302 may be performed in any of the ways described herein.

In step 1304, a morphing heuristic is applied to each of the first and second anamorphic video content instances to result in first and second morphed video content instances having a common aspect ratio, a common resolution, and a common container. Step 1304 may be performed in any of the ways described herein.

In step 1306, the first and second morphed video content instances are frame synchronized. Step 1306 may be performed in any of the ways described herein.

In step 1308, a comparative analysis of the frame synchronized first and second morphed video content instances is performed. Step 1308 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
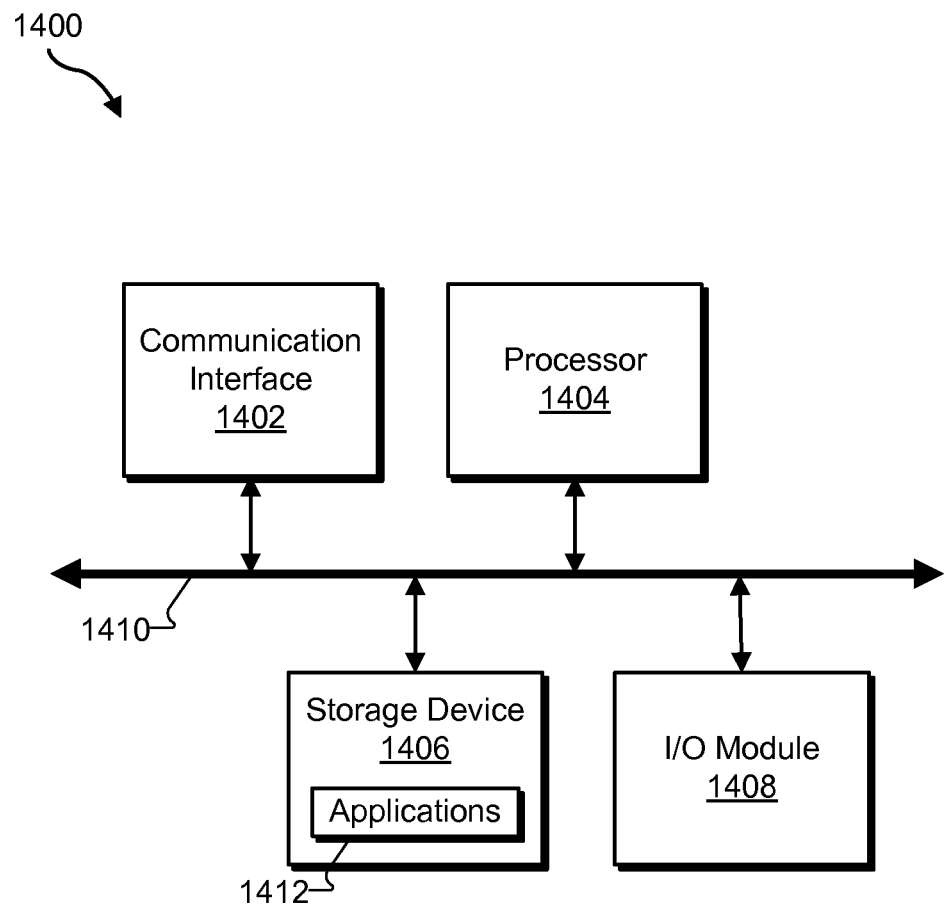
FIG. 14 illustrates an exemplary computing device according to principled described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with video capture facility 102, morphing facility 104, frame synchronization facility 106, and/or analysis facility 108. Likewise, storage facility 110 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    capturing, by a video content analysis system, a first set of video frames representative of a first video content instance and a second set of video frames representative of a second video content instance;
    applying, by the video content analysis system, a morphing heuristic to at least one of the first and second sets of video frames;
    morphing, by the video content analysis system and in response to the application of the morphing heuristic, an aspect ratio, a resolution, and a container of at least one of the first and second sets of video frames such that the first and second sets of video frames share a common aspect ratio, a common resolution, and a common container, wherein the common container is one of a windowboxed container or a non-windowboxed container for the first and second sets of video frames;
    frame synchronizing, by the video content analysis system subsequent to the applying of the morphing heuristic, the first and second sets of video frames; and
    performing, by the video content analysis system, a comparative analysis of the frame synchronized first and second sets of video frames.

2. The method of claim 1, wherein the capturing of the first and second sets of video frames comprises:
    receiving analog video representative of the first and second video content instances by way of one or more analog video inputs;
    encoding the analog video into a digital format;
    generating the first and second sets of video frames by transcoding the encoded analog video; and
    storing each video frame included in the first and second sets of video frames as an individual file.

3. The method of claim 2, further comprising recording the encoded analog video.

4. The method of claim 3, further comprising providing, by the video content analysis system, the recorded analog video for display within a video content analysis portal.

5. The method of claim 1, wherein the capturing of the first and second sets of video frames comprises:
    receiving digital video representative of the first and second video content instances by way of one or more digital video inputs;
    generating the first and second sets of video frames by transcoding the received digital video; and
    storing each video frame included in the first and second sets of video frames as an individual file.

6. The method of claim 1, wherein the capturing of the first and second sets of video frames comprises:
    processing a first file comprising data representative of the first video content instance and a second file comprising data representative of the second video content instance, wherein the processing comprises
        generating the first and second sets of video frames by transcoding the data included in the first and second files, and
        storing each video frame included in the first and second sets of video frames as an individual file.

7. The method of claim 1, wherein the capturing of the first set of video frames comprises:
    processing data acquired by at least one video camera and representative of the first video content instance, wherein the processing comprises
        generating the first set of video frames by transcoding the data acquired by the at least one video camera, and
        storing each video frame included in the first set of video frames as an individual file.

8. The method of claim 1, wherein the applying of the morphing further comprises removing extended imagery from one of the first and second sets of video frames.

9. The method of claim 1, wherein the frame synchronized first set of video frames comprises a first video frame and the frame synchronized second set of video frames comprises a second video frame temporally corresponding to the first video frame, and wherein the performing of the comparative analysis comprises performing a pixel by pixel comparison of spatially corresponding pixel within the first and second video frames.

10. The method of claim 9, wherein the performing of the comparative analysis further comprises generating a composite delta value representing an overall difference between the first and second video frames based on the pixel by pixel comparison.

11. The method of claim 10, further comprising:
    designating, by the media content analysis system, at least one of the first and second video frames as including an error if the composite delta value is greater than a predetermined threshold.

12. The method of claim 1, further comprising logging, by the video content analysis system, one or more errors identified by the comparative analysis.

13. The method of claim 12, further comprising displaying, by the video content analysis system, one or more display elements representative of the one or more errors.

14. The method of claim 13, further comprising:
    detecting, by the video content analysis system, user input representative of a selection of a display element included in the one or more display elements, the display element representative of an error included in the one or more errors; and
    displaying, by the video content analysis system in response to the user input, a video frame included in the frame synchronized first set of video frames and a video frame included in the frame synchronized second set of video frames that both correspond to the error.

15. The method of claim 1, wherein the common aspect ratio is substantially equal to a 4:3 aspect ratio, the common resolution is substantially equal to a 320 by 240 pixel resolution, and the common container includes a non-windowboxed container.

16. The method of claim 1, wherein the capturing of the first and second sets of video frames is performed at a common frame capture rate.

17. The method of claim 1, wherein the capturing of the first and second sets of video frames comprises:
- capturing the first set of video frames at a frame capture rate substantially equal to a native frame rate of the first video content instance; and
- capturing the second set of video frames at a frame capture rate substantially equal to a native frame rate of the second video content instance.

18. The method of claim 1, further comprising performing, by the video content analysis system, an unreferenced video analysis of the frame synchronized first and second sets of video frames.

19. The method of claim 1, further comprising providing, by the video content analysis system, first and second video content instances represented by the frame synchronized first and second sets of video frames for display within a video content analysis portal.

20. The method of claim 1, wherein the first video content instance is provided by a first media content access device communicatively coupled to the video content analysis system and wherein the second video content instance is provided by a second media content access device communicatively coupled to the video content analysis system.

21. The method of claim 1, embodied as computer-executable instructions on at least one non-transitory computer-readable medium.

22. A method comprising:
- capturing, by a video content analysis system, a first anamorphic video content instance and a second anamorphic video content instance;
- applying, by the video content analysis system, a morphing heuristic to each of the first and second anamorphic video content instances;
- morphing, by the video content analysis system, and in response to the application of the morphing heuristic, an aspect ratio, a resolution, and a container of at least one of the first and second morphed video content instances such that the first and second morphed video content instances share a common aspect ratio, a common resolution, and a common container, wherein the common container is one of a windowboxed container or a non-windowboxed container for the first and second sets of video frames;
- frame synchronizing, by the video content analysis system, the first and second morphed video content instances; and
- performing, by the video content analysis system, a comparative analysis of the frame synchronized first and second morphed video content instances.

23. A system comprising:
- a video capture facility configured to capture a first set of video frames representative of a first video content instance and a second set of video frames representative of a second video content instance;
- a morphing facility communicatively coupled to the video capture facility and configured to
  - apply a morphing heuristic to at least one of the first and second sets of video frames, and
  - morph, in response to the application of the morphing heuristic, an aspect ratio, a resolution, and a container of at least one of the first and second sets of video frames such that the first and second sets of video frames share a common aspect ratio, a common resolution, and a common container, wherein the common container is one of a windowboxed container or a non-windowboxed container for the first and second sets of video frames;
- a frame synchronization facility communicatively coupled to the morphing facility and configured to frame synchronize the first and second sets of video frames; and
- an analysis facility communicatively coupled to the frame synchronization facility and configured to perform a comparative analysis of the frame synchronized first and second sets of video frames.

* * * * *